United States Patent
Komatsu

[19]

[11] Patent Number: 5,959,279
[45] Date of Patent: Sep. 28, 1999

[54] MAGNETIC PATTERN RECOGNITION METHOD AND APPARATUS

[75] Inventor: Kenji Komatsu, Suwa, Japan

[73] Assignee: Seiko Epson Corporation, Tokyo, Japan

[21] Appl. No.: 08/837,060

[22] Filed: Apr. 10, 1997

[30] Foreign Application Priority Data

Apr. 10, 1996 [JP] Japan .................................. P8-88448

[51] Int. Cl.⁶ ..................................................... G06K 7/08
[52] U.S. Cl. ............................................ 235/449; 235/493
[58] Field of Search .................................. 235/435, 449, 235/450, 493, 494

[56] References Cited

U.S. PATENT DOCUMENTS

| | | | |
|---|---|---|---|
| 4,684,794 | 8/1987 | Holland-Letz | 235/449 |
| 5,045,674 | 9/1991 | Mita et al. | 235/439 |
| 5,430,280 | 7/1995 | Kikuchi | 235/449 |
| 5,479,532 | 12/1995 | Abel et al. | 235/449 |

*Primary Examiner*—Robert Kim
*Attorney, Agent, or Firm*—Michael T. Gabrik

[57] ABSTRACT

A magnetic pattern recognition method and apparatus capable of preventing magnetic noise from the pulse motor from affecting MICR character recognition processing while said pulse motor transports a document printed with MICR characters. The pulse motor is driven and noise signals detected by the magnetic head from a portion of the document not containing MICR characters are captured synchronized to the drive pulse. This is repeated for plural cycles to obtain the medium of plural signals as the compensation data. The raw detection signals detected by the magnetic head from another portion of the document containing MICR characters are then captured synchronized to the drive pulse. The compensation data is then subtracted from the raw detection signals to obtain the MICR character recognition data.

16 Claims, 7 Drawing Sheets

MAGNETIC PATTERN RECOGNITION METHOD AND APPARATUS

BACKGROUND OF THE INVENTION

1. Field of the Invention

The invention relates to a method and apparatus for recognizing and reading magnetic ink characters and other magnetic patterns printed on a document and, is specifically concerned with improved techniques for magnetic character recognition in multipurpose point-of-sale ("POS") devices.

2. Description of the Related Art

Use of magnetic ink character recognition devices to discriminate checks and other forms of commercial paper printed with magnetic ink characters has become widespread within the world financial community. In addition to cash and credit cards, personal checks are widely used for shopping as well as paying bills. The face of such checks are typically printed with the check writer's account number, check serial number, routing information and other information using magnetic ink characters conforming to the well-known Magnetic Ink Character Recognition Standard to enable both electromechanical and human dissemination of the so-encoded data. This information can then be read to, for example, determine check validity and avoid fraud or counterfeiting.

This has led to the use of devices for reading magnetic ink characters in retail store POS stations and check-out counters. Many of these magnetic ink character recognition devices use DC motors to transport the personal check slips by a magnetic head for magnetic ink character recognition.

The use of such magnetic ink character recognition (MICR) devices at individual POS stations necessitates devices that are compact, easy to operate, and extremely reliable. After a personal check has been passed through the MICR reader for magnetic ink character recognition, it is necessary to load the check into a printer for indorsement printing, for example. This has led to the development of compound POS printers comprising both MICR reader and conventional POS printer functions such as that shown in FIG. 1.

Figure 1:
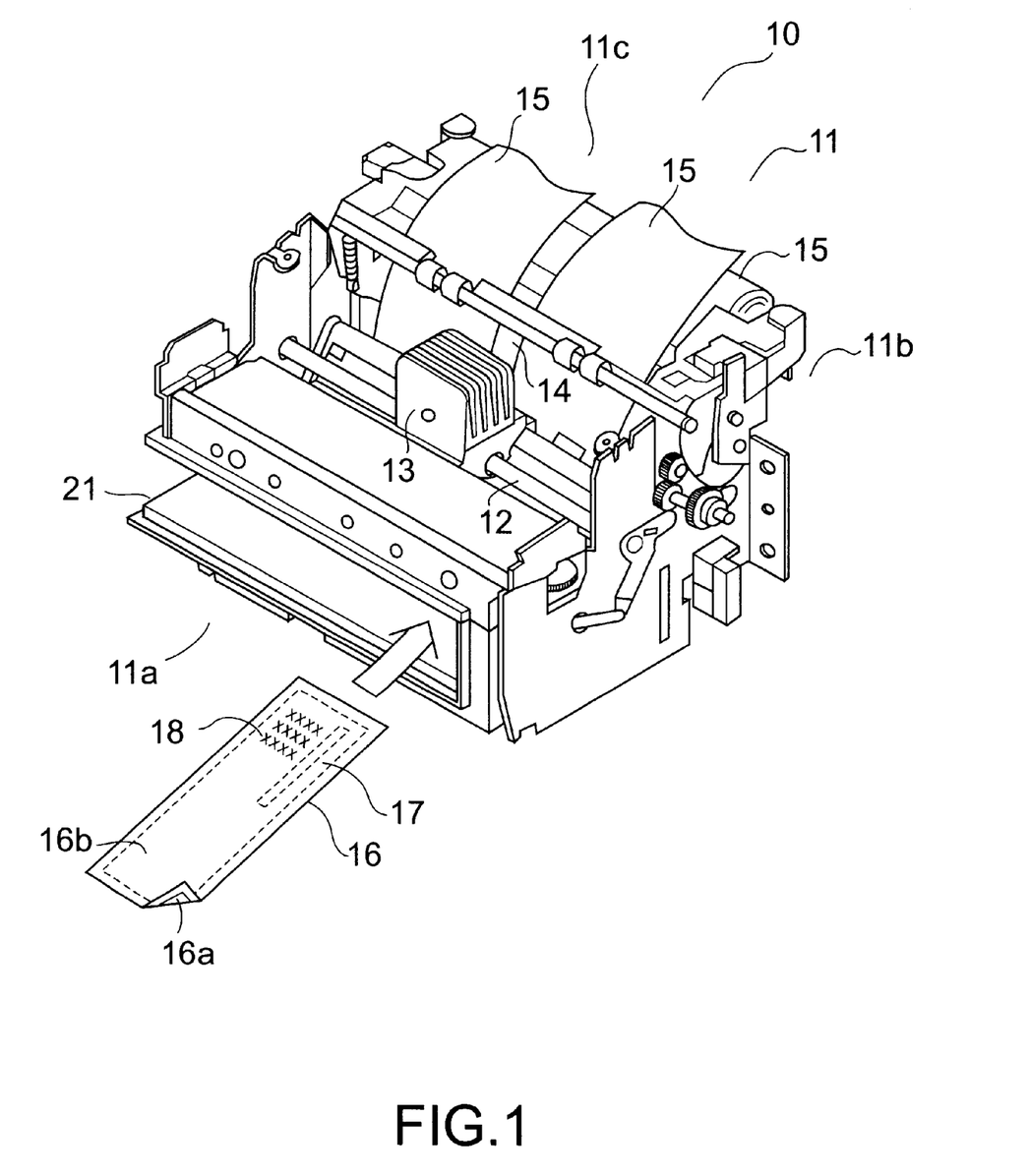
FIG. 1 is an overview of a compound POS printer in which a presently preferred embodiment of the invention may be implemented.

The compound POS printer shown in FIG. 1 incorporates an MICR reader function into a printer that holds two rolls of paper, one of which is used for journal printing and the other for printing receipts, and can print to single slip forms inserted from the bottom of the apparatus. This type of compound POS printer is a compact, high functionality device that can automatically handle the multiple operations from MICR reading to indorsement required to process the personal check. This makes such devices suited for use in POS applications, and they are expected to be widely used in stores, hotels, and other commercial establishments.

One serious obstacle preventing more widespread adoption of compound POS has been the presence of undesirable amounts of magnetic noise during magnetic ink character reading caused by the printer transport mechanism. In dedicated MICR readers having only an MICR character reading function this problem is addressed by assuring sufficient distance between the magnetic head and the drive motor, which is the major source of magnetic noise, or by using a dc motor, which produces relatively little magnetic noise.

However, in the above-described compound POS printers, it is difficult to obtain sufficient distance between the motor and head while still accommodating routine recording operations. Providing a separate motor and drive system only for MICR character reading also increases device size as well as the complexity of the control circuitry involved, the total cost, and device weight. It is therefore desirable to share the transportation mechanism and other components used for printing. In this case, it is preferable to read the MICR characters while transporting the personal check past the magnetic head by means of a transportation mechanism that uses a pulse or stepping motor suitable for conventional printing operations. To accomplish this, however, some means of eliminating the magnetic noise from the pulse motor is required.

While magnetic noise can be conventionally suppressed by providing a magnetic shield between the pulse motor and magnetic head, it is difficult in a compact POS printer design to suppress magnetic noise to a sufficiently low level using such a shield. The condition of the MICR characters printed on personal checks can also vary as a result of soiling, folds, and the like on the check face, and noise during recognition must therefore be suppressed as much as possible in order to read MICR characters with a high recognition rate.

OBJECTS OF THE INVENTION

It is, therefore, an object of the present invention to provide a method and apparatus for recognizing MICR characters and other magnetic patterns while suppressing the effects of magnetic noise emanating from the transport mechanism motor.

A further object of the invention is to provide a compound POS printer achieving a high MICR character recognition rate and acceptable recording capabilities.

SUMMARY OF THE INVENTION

To achieve these and related objects, a compound POS printer according to the present invention detects background noise in substantially the same environment just prior to before detecting the MICR characters or similar magnetic pattern, and then filters the perceived noise from a second signal obtained by magnetic pattern detection to generate improved recognition signal output.

More specifically, recognizing magnetic patterns in accordance with the present invention includes:

(1) moving the magnetic head relative to a portion of the document not containing a magnetic pattern via the transport mechanism;

(2) storing a noise signal detected by the magnetic head during movement to this non-magnetically inked document area;

(3) moving the magnetic head relative to a document portion including one or more magnetic patterns via the aforementioned transport mechanism and detecting these magnetic patterns using the magnetic head to obtain one or more raw pattern recognition signals; and (4) filtering the magnetic noise from the raw pattern recognition signals through subtracting the stored noise signal from the raw pattern recognition signals detected by the magnetic head to develop and output a filtered magnetic pattern recognition signal.

Since the magnetic noise generated by a pulse motor transport mechanism is periodic in nature, it is preferable to consider the period of the magnetic noise when filtering out the background noise. Magnetic noise from the pulse motor varies in a cyclical manner due to the drive pulse effecting phase changes in the pulse motor. It is therefore preferable for the detection timing for noise and raw pattern recognition to be synchronized to issued drive pulses. Moreover, when the pulse motor is controlled based on a specific control cycle defined by plural drive pulses, e.g., when the pulse motor is controlled based on the motor turning one step angle or one revolution, magnetic noise occurs primarily on aperiodic basis. It is therefore preferable for the detection timing of the noise signal to be synchronized to plural drive pulses constituting at least one control cycle of the pulse motor.

According to the presently preferred embodiment of the invention, each magnetic noise signal and each raw recognition signal perceived as above may be the average of a certain number of respective samples obtained at a corresponding number of successive time points within the noise component's period (i.e. control cycle).

In addition to the periodic noise, aperiodic or spurious magnetic noise is likely to occur during MICR recognition, as a result of the introduction of minute magnetic particles to the detection system, power supply noise, or the like. Therefore, according to the preferred embodiment, magnetic noise recognition involves sampling perceived noise signals at preselected time points within each noise component period for plural control cycles or periods. At each time instant, these so-sampled noise signals are likely to show a certain dispersion about a medium signal value due to spurious magnetic noise fluctuations of the otherwise periodic components of the perceived magnetic noise. By taking this medium value as being representative of the cumulative noise signal at the respective time instant to be subtracted from the corresponding raw recognition signal, spurious noise can be excluded from unduly influencing the measurement result for the perceived periodic components of the magnetic noise signal, and thus prevent overemphasis of spurious noise fluctuation during subsequent raw pattern recognition signal compensation. It is also forseeable to use the average of plural noise signals obtained over a period of plural control cycles for the filtering operations.

It is also possible to easily improve the MICR character recognition rate in compact POS devices by adopting the aforementioned magnetic pattern recognition method of the present invention.

Specifically, the above-described techniques of the present invention can be used in a magnetic pattern recognition apparatus comprising a transport mechanism having a pulse motor that is controlled by a drive pulse, a magnetic head for detecting magnetic patterns while being moved relative to a portion of a document area containing one or more magnetic patterns by means of the transport mechanism, a storage unit for storing a noise signal detected by the magnetic head when the magnetic head is moved by the relative to a portion of the document not containing a magnetic pattern, and a filtering unit filtering out the background noise from raw pattern matching signals detected by the magnetic head when the magnetic head is moved by the transport mechanism relative to a portion of the document containing a magnetic pattern and outputting the result as a filtered magnetic pattern recognition signal.

According to the present invention, when magnetic noise from the pulse motor is perceived, the storage unit preferably stores the noise signal at a timing synchronized to the drive pulse, and the filtering unit accomplishes the filtering and pattern recognition signal compensation processes at a timing synchronized to the drive pulse.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENT

The preferred embodiment of the present invention is described below with reference to the accompanying figures. It should be noted that the invention is described below with reference to a compound POS printer (hereafter "printer") 10 having MICR character recognition according to the preferred embodiment and conventional recording functions combined in a common unit, as shown in FIG. 1.

The print head 13 in printer 10 travels along a guide shaft 12 extending side to side inside the main body 11, and can be used both for journal printing to roll paper and slip printing to single forms.

The print head 13 of this printer is described by way of example only as an impact type wire dot print head. Printing is accomplished by driving the wires in the print head 13 toward platen 14, causing the wires to impact an ink ribbon and print to either roll paper 15 or slip form 16.

Print head 13 is moved by a print head driver using a conventional timing belt and pulse motor arrangement, as depicted in FIG. 1. Print head 13 thus moves side to side along platen 14 to print to a particular position on roll paper 15 or slip form 16.

Roller paper 15 and slip form 16 are transported perpendicularly to the direction of print head 13 movement by a paper transportation mechanism comprising a feed roller group and paper transportation pulse motor as described hereinbelow with reference to FIGS. 2A and 2B. Roller paper 15 is loaded at back 11b of main body 11, and is fed from back 11b between platen 14 and print head 13 to the top 11c of main body 11. Note that printer 10 of the present embodiment can hold two rolls of roll paper 15 to print both customer receipts and a sales journal for record-keeping purposes.

The printer of the present embodiment can also process slip forms 16 such as personal checks printed with MICR data. Slip form 16 is inserted into the paper path described hereinbelow from form insertion opening 21 at front 11a of main body 11, passed between print head 13 and platen 14, printed, and then ejected from printer top 11c.

It should be noted that a personal check is used as slip form 16 in the following description by way of example only, and it will be obvious that the printer of the present embodiment can print to a variety of single sheet forms other than personal checks, including ledger forms, receipts, and other slip forms. It should be noted further that the personal checks referenced below are checks written by individuals to pay for store purchases and issued by banks or other financial institutions. MICR characters 17 encoding the user's account number, check serial number, or other information are printed on face 16a of the personal check using magnetic ink.

It should also be noted that both the form and quality of MICR characters are standardized, as well as the position to which they are printed on each personal check. It is therefore possible to obtain a waveform corresponding to the MICR characters by scanning particular portions of the personal check with the magnetic head. The printed data can then be identified by analyzing this waveform. Note that a magnet is passed over the portions in which the MICR characters are printed to magnetize the MICR characters prior scanning with the magnetic head is performed.

The payment amount and account holder signature are also written on face 16a of personal check 16. An indorsement 18 containing the date the check was received, store name, account number, amount, or other information is also printed on back 16b of personal check 16. When the check is received by store personnel, check validity is confirmed based on the data printed with MICR characters, and valid personal checks are then indorsed.

To enable indorsement printing 18 using print head 13 in the printer of the invention, personal check 16 is inserted to form insertion opening 21 face 16a down, i.e., back 16b up. This means that personal check 16 is inserted to form insertion opening 21 with MICR characters 17 facing down along the right side of the printer.

Figure 2A:
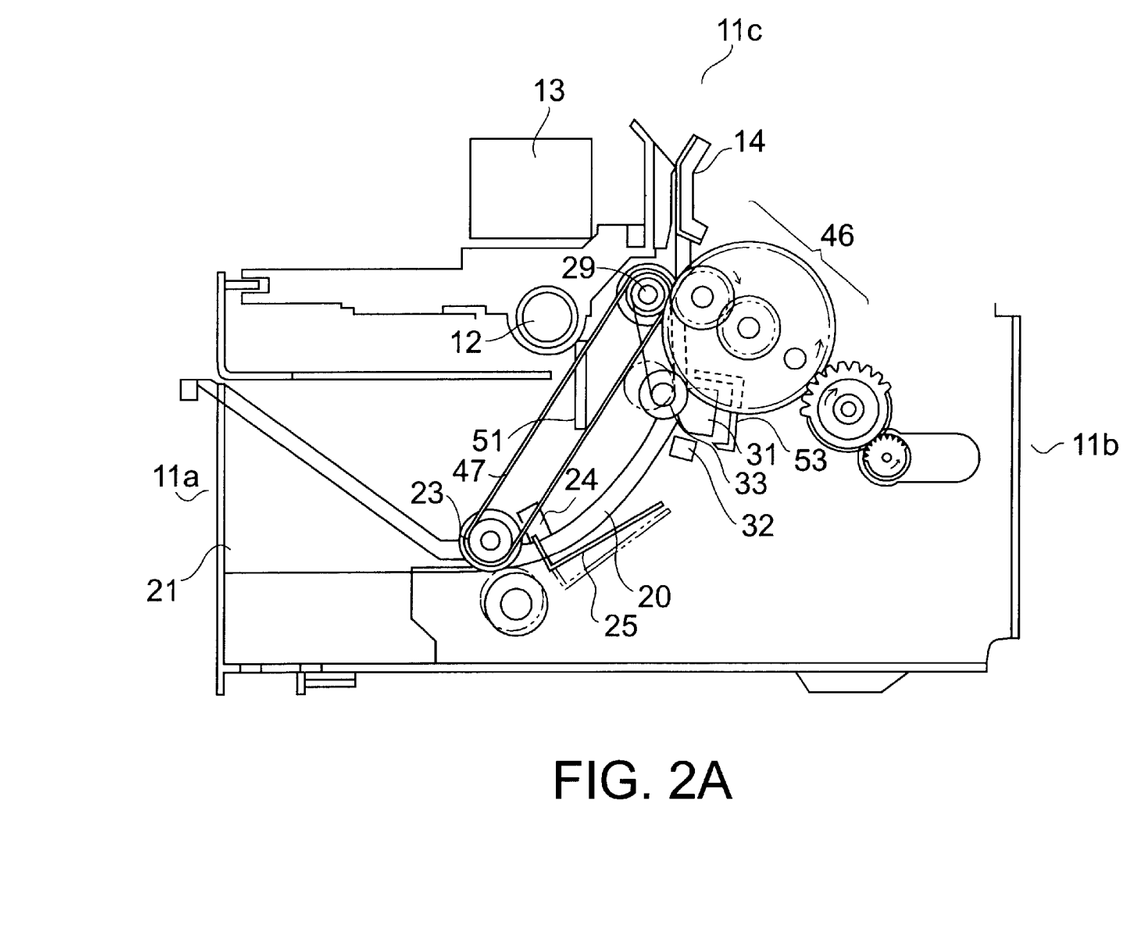
FIG. 2A is a simplified cross section of the paper path of the POS printer in FIG. 1.
Figure 2B:
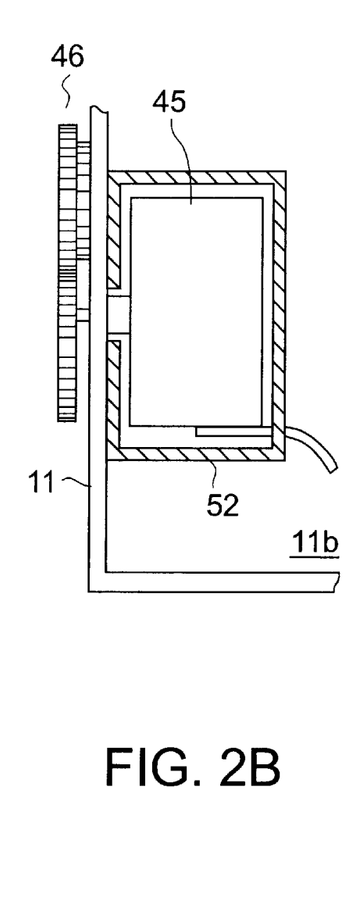
FIG. 2B is a simplified cross section of the pulse motor of the POS printer of FIGS. 1 and 2A.

The paper path of printer 10 according to the present embodiment is shown in cross section in FIG. 2A. Roll paper 15 is fed from behind platen 14 to the gap between platen 14 and print head 13, and printed. The roller (not shown in the figures) transporting the roll paper 15 is driven by pulse motor 45 (FIG. 2B) via gear set 46 to enable printing to a particular position of the roll paper. Personal checks and other slip forms 16 are transported through paper path 20 to the gap between platen 14 and print head 13. Slip form 16 is held by slip form loading roller 23 and slip form transportation roller 29, which is driven by pulse motor 45 via gear set 46 and drive belt 47, and is transported either forward or backward along paper path at a particular rate.

Pulse motor 45, which serves as the paper transportation drive source, is thus connected by means of a paper transportation power transfer selection mechanism comprising plungers or other similar means, both to the power transfer mechanism for transporting the roll paper and the power transfer mechanism for transporting slip forms. Drive power can thus be transferred from pulse motor 45 to either power transfer mechanism.

A personal check 16 is not normally loaded in the printer, and is only loaded from form insertion opening 21 when printing is required. Slip form loading roller 23, paper detector 24, form stopper 25, magnet 32, and magnetic head 31 are disposed in sequence in slip form paper path 20. When the operator then inserts personal check 16 to form insertion opening 21, the leading edge of personal check 16 is advanced by slip form loading roller 23 to slip form transportation roller 29. Now held by slip form transportation roller 29 and slip form loading roller 23, the MICR character portion of the check is transported in front of magnetic head 31 for MICR character recognition processing. Printing starts after personal check 16 is advanced from slip form transportation roller 29 to platen 14.

During the MICR character recognition processing, personal check 16 is advanced through paper path 20 by slip form loading roller 23 so that the MICR characters pass first over magnet 32. Magnet 32 is disposed facing face 16a of personal check 16, and magnetizes the magnetic ink of the MICR characters printed on face 16a. Personal check 16 then passes over magnetic head 31, and magnetic head 31 detects the MICR characters. The printer of this embodiment also comprises head presser 33 disposed opposite magnetic head 31 from the other side of paper path 20 such that personal check 16 passes between head presser 33 and magnetic head 31. As a result head presser 33 presses face 16a of personal check 16 against magnetic head 31 as it passes over magnetic head 31, thereby enabling the MICR characters to be detected more easily without error. It should be noted that MICR character reading can be accomplished after remagnetizing the ink using magnet 32 as described above, or an auto-bias magnetic head 31 can be used, in which case magnet 32 is not needed.

Printer 10 of the present embodiment described above thus serves as a compound POS printer comprising, in addition to the ability to print to slip forms, a function for reading MICR data printed on personal checks and other slip forms. Furthermore, these functions are disposed such that both printing and MICR character reading can be executed to slip forms transported through a single paper path. As a result, reading MICR characters printed on the face of personal checks and printing data to personal checks, particularly printing indorsement information, can be accomplished in a continuous sequence without removal of the check from the printer.

To simplify printer construction and control, reduce printer size, and provide a multi-function printer at low cost, the printer of the present embodiment uses the same paper transportation mechanism to transport personal check 16 to the magnetic head 31 for MICR character reading and recognition, as well as to transport personal check 16 to print head 13 for printing. It is therefore possible by varying the speed of the pulse motor driving the rollers to combine the function transporting check forms for MICR character reading and the function transporting check forms for printing.

The preferred paper transportation speed during printing is 70–90 mm/sec. Faster paper transportation speeds during printing can cause the printing position to shift, thus degrading print quality and incurring higher cost for a mechanism able to assure sufficient precision in the stopping position.

In current MICR data analyzers whereby a signal obtained by a magnetic head is analyzed for MICR character recognition, however, the preferred paper transportation speed yielding the specified recognition rate is approximately 100 mm/sec, with some variation relating to the MICR data format and detection characteristics of the magnetic head possible.

As a result, the printer of the present embodiment is designed to transport personal check forms at the transportation speed best suited to the function being used by changing the speed of pulse motor 45. It should be recognized here, however, that the invention shall not be so limited, and it will become obvious to those ordinarily skilled in the art that, instead of changing the motor speed, the gear set can be adjusted to change the speed reduction ratio when transporting a form for MICR character reading and transporting the form for printing. In either case, however, using pulse motor 45 to enable MICR character recognition is preferable as a way of simplifying the mechanism and achieving a compact, low-cost, multiple function printer.

As mentioned hereinabove, it is important to minimize the magnetic noise affecting magnetic head 31 operation during MICR character recognition processing. Magnetic fields of variable strength and orientation leaking from the pulse motor can particularly become sources of noise affecting recognition performance. As a result, printer 10 of the preferred embodiment stops all motors other than pulse motor 45 transporting personal check 16 during MICR character reading, and covers the sides and bottom of the working pulse motor 45 with a magnetic shield 52 as shown in FIG. 2B to minimize magnetic leakage. Magnetic head 31 is also covered by shield plate 53 and another shield plate 51 is disposed in front of magnetic head 31 to reduce magnetic noise transferred by such as the motor shaft and chassis, thereby enabling stable, high precision MICR character reading.

Figure 3:
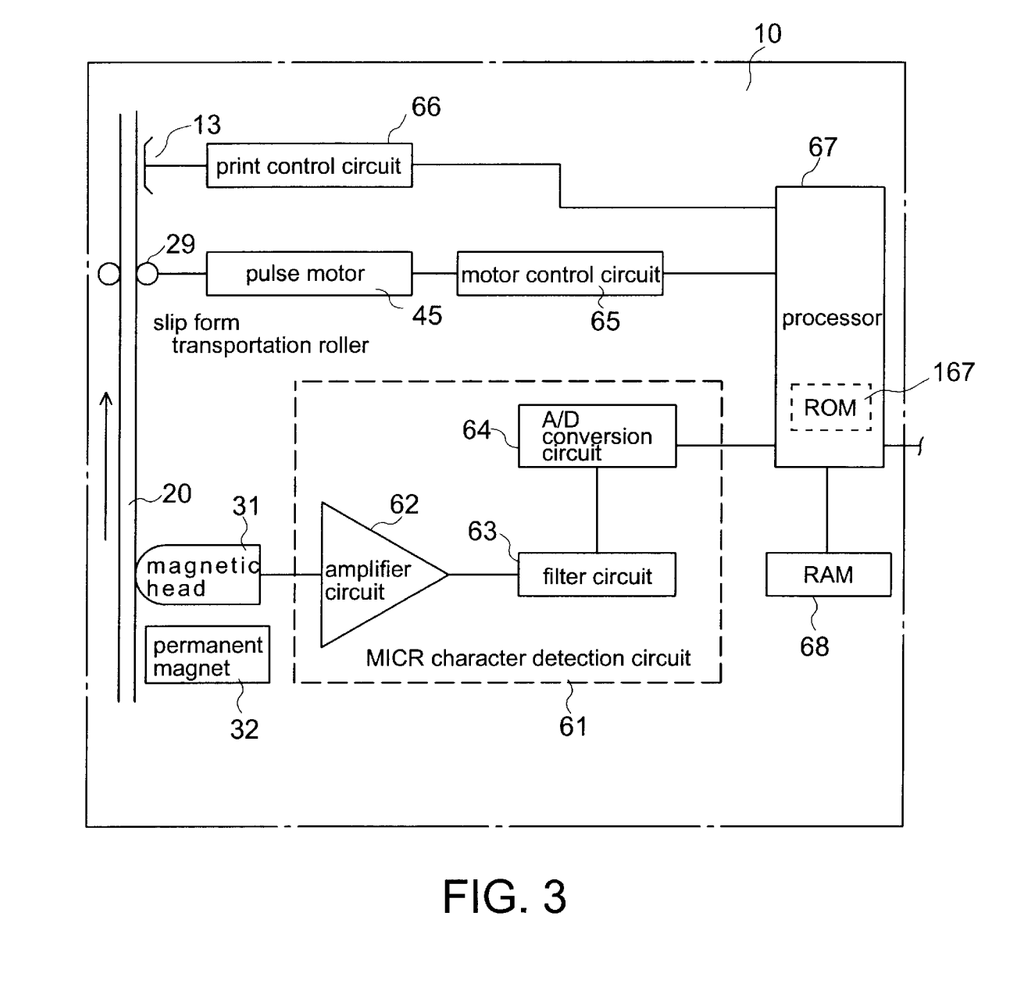
FIG. 3 is a block diagram used to describe the mechanism for recognizing MICR characters according to the preferred embodiment.

Measures to reduce the effects of magnetic noise and assure a high MICR character recognition rate are also implemented in the MICR character recognition process itself. FIG. 3 is a block diagram of the control mechanism of printer 10 used for MICR character recognition processing according to the preferred embodiment of the invention.

Referring to FIG. 3, magnetic head 31 detects MICR characters and outputs the detection data to processor 67 via MICR character detection circuit 61.

Processor 67 here includes functionality for capturing the data from MICR character detection circuit 61 while scanning the area not containing MICR characters, and storing this data to RAM 68 as compensation data reflecting the magnetic noise from the pulse motor; functionality for capturing raw recognition data from MICR character detection circuit 61 while scanning the area containing MICR characters, and applying to this data a compensation process using the compensation data stored in RAM 68 to obtain filtered recognition data; and functionality for outputting the recognition data to an external device such as a computer. Processor 67 includes also functionality for controlling the paper transportation mechanism, including slip form transportation roller 29, supplying the drive pulse to motor control circuit 65 for the paper transportation pulse motor 45, and controlling phase changing pulse motor 45 to control pulse motor 45 speed and rotation position. Processor 67 also comprises functionality for controlling print control circuit 66 for printing with print head 13.

In the preferred embodiment of the invention, the aforementioned functionality for capturing storing noise data 7, capturing and compensating raw recognition data based on the captured noise data 3 and for controlling printer transport and recording operations handled by processor 67 is achieved through having processor 67 execute appropriate program code statements residing in integral ROM 167 of the processor 67.

As is well known in the art, the syntalical and semantic relationships of particular code statements rare but a matter of routing design choice dependent in part of the type of microcontroller, or microprocessor or similar intelligent device chosen to implement processor 67, as long as it has sufficient resources to execute the MICR data capture, storage, compensation, and transport movement steps as detailed hereinbelow with reference to FIGS. 4, 5A and 5B. Likewise, it will become apparent to those ordinarily skilled in the art that, although preferably residing in ROM 167, these code statements may be contained within any computer readable storage medium external to or a component of printer 10 (such as RAM 68) as long as it can be accessed by processor 67.

MICR character detection circuit 61 comprises amplifier circuit 62 for amplifying the minute voltage changes effected by the change in the flux density detected by magnetic head 31, filter circuit 63 for removing various noise components and extraneous signals resulting from printing defects, and A/D conversion circuit 64 for A/D converting the analog signal from filter circuit 63 and outputting a digital value.

Figure 6:
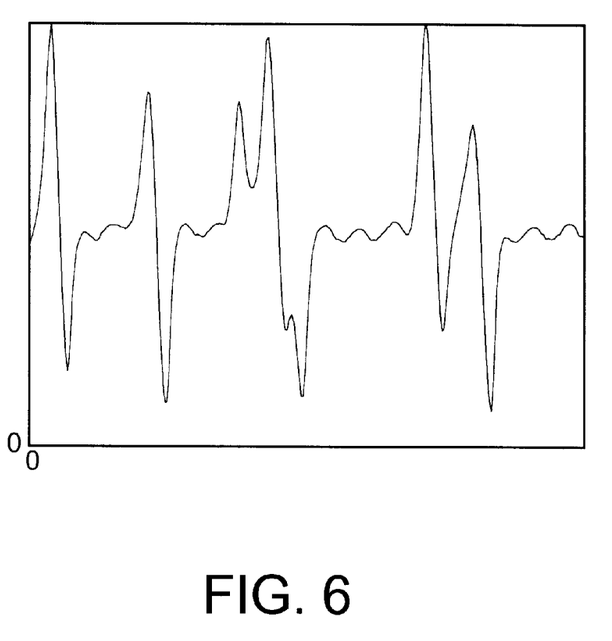
FIG. 6 is a graph showing an example of raw recognition data when MICR characters are detected without filtering and compensation processing according to the preferred embodiment of the invention.
Figure 7:
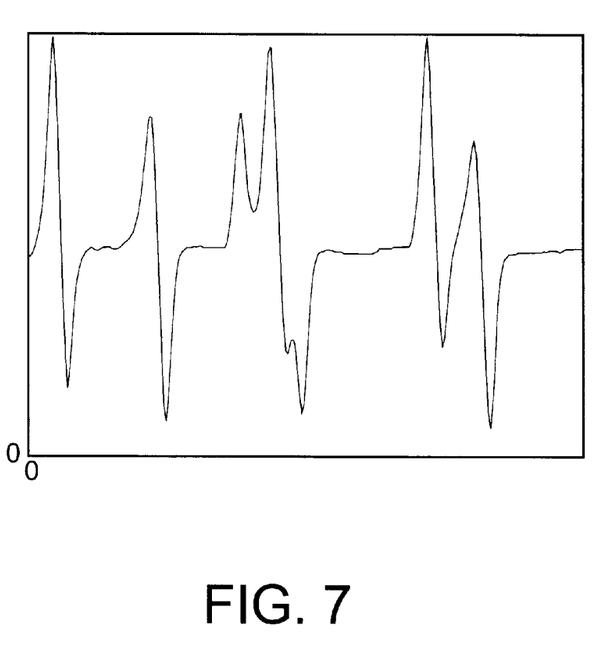
FIG. 7 is a graph showing an example of filtered recognition data when MICR characters are detected with filtering compensation processing according to the preferred embodiment of the invention.

Filter circuit 63 is constructed to remove extraneous signals from magnetic head 31 using a cut-off frequency determined by the paper transportation speed of the check and the length of gaps in the MICR character string according to the MICR standard. In addition to magnetic density fluctuations caused by MICR characters magnetized by permanent magnet 32 crossing the head gap of the magnetic head, magnetic head 31 also detects magnetic noise from magnetic flux density changes primarily caused by phase changes in pulse motor 45. Voltage changes resulting from this magnetic noise are therefore also amplified, converted by A/D conversion circuit 64, and output to processor 67. As a result, cyclical noise synchronized to phase changing pulse motor 45 becomes superimposed on the MICR character recognition signal as shown in FIG. 6 in which the MICR character recognition signal obtained from the text "234" is shown.

To remove the effects of such magnetic noise in accordance with the preferred embodiment of the present invention, the detection signal from magnetic head 31 begins to be processed before the MIC "Magnetic Ink Character" region of check 16 reaches the magnetic head. At this time, since there are no MICs to be detected by magnetic head 31, the detection signal represents the noise component only. In this way, the noise component can be measured separately and used later to remove the noise component from the noisy MICR signal.

The MICR character recognition process of printer 10 according to the preferred embodiment is described next below with reference to the flow charts in FIG. 4 and FIGS. 5A–5B.

Figure 4:
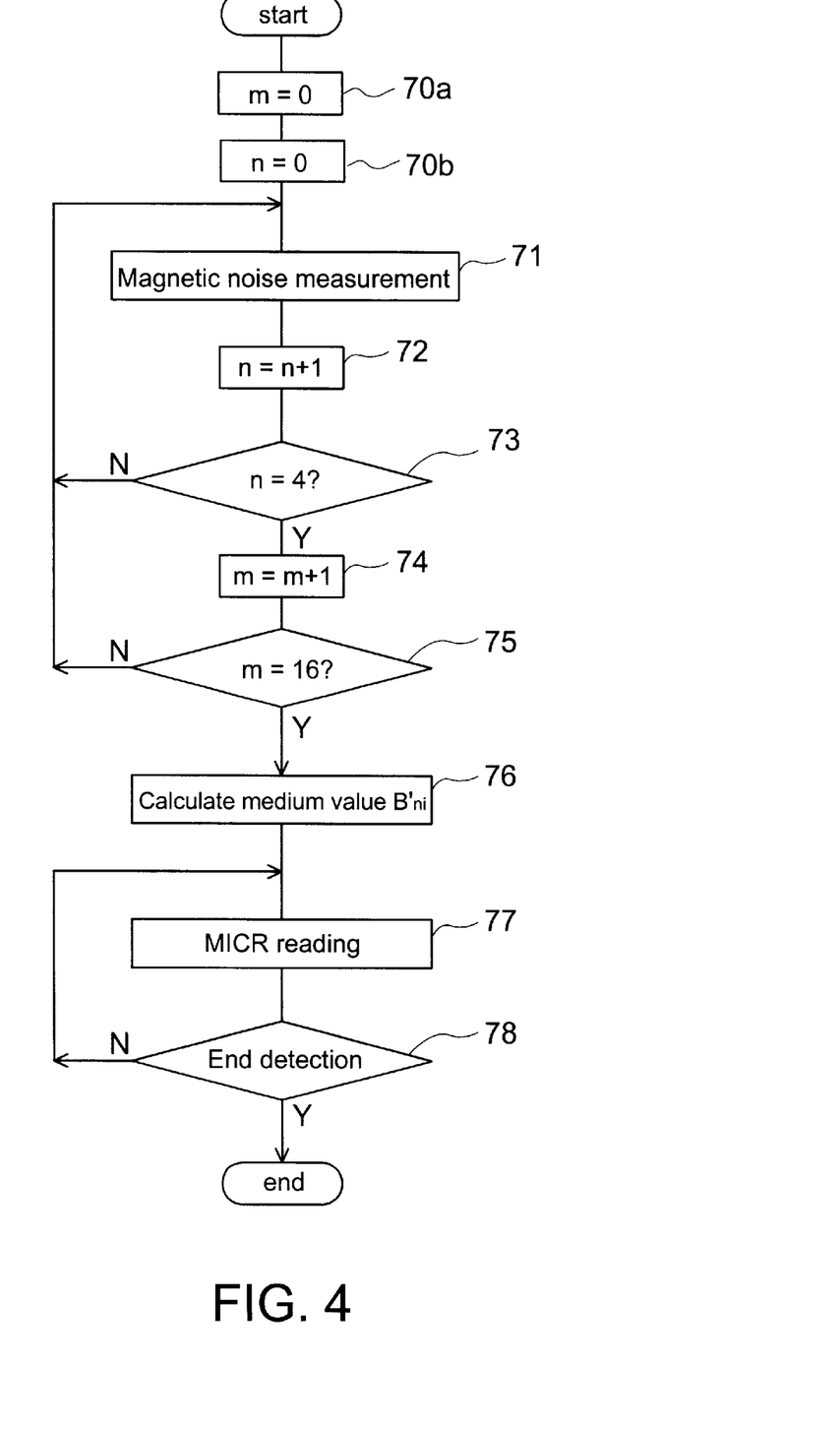
FIG. 4 is a flow chart used to describe MICR character recognition executed by the mechanism of FIG. 3.

Referring first to FIG. 4, Count variables m and n are initialized to zero in step 70*a* and 70*b* (the purpose of m and n will be explained in greater detail hereinbelow). Then noise data returned by magnetic head 31 from a portion of the check 16 in which there are no MICR characters is captured first using the idle time in which the area of personal check 16 containing MICR characters is transported to magnetic head 31 (step 71). This noise data is the "magnetic noise data" used later for filtering compensation processing according to the preferred embodiment. The process in which data is captured by magnetic head 31 according to the preferred embodiment is shown in greater detail in FIG. 5A.

Figure 5A:
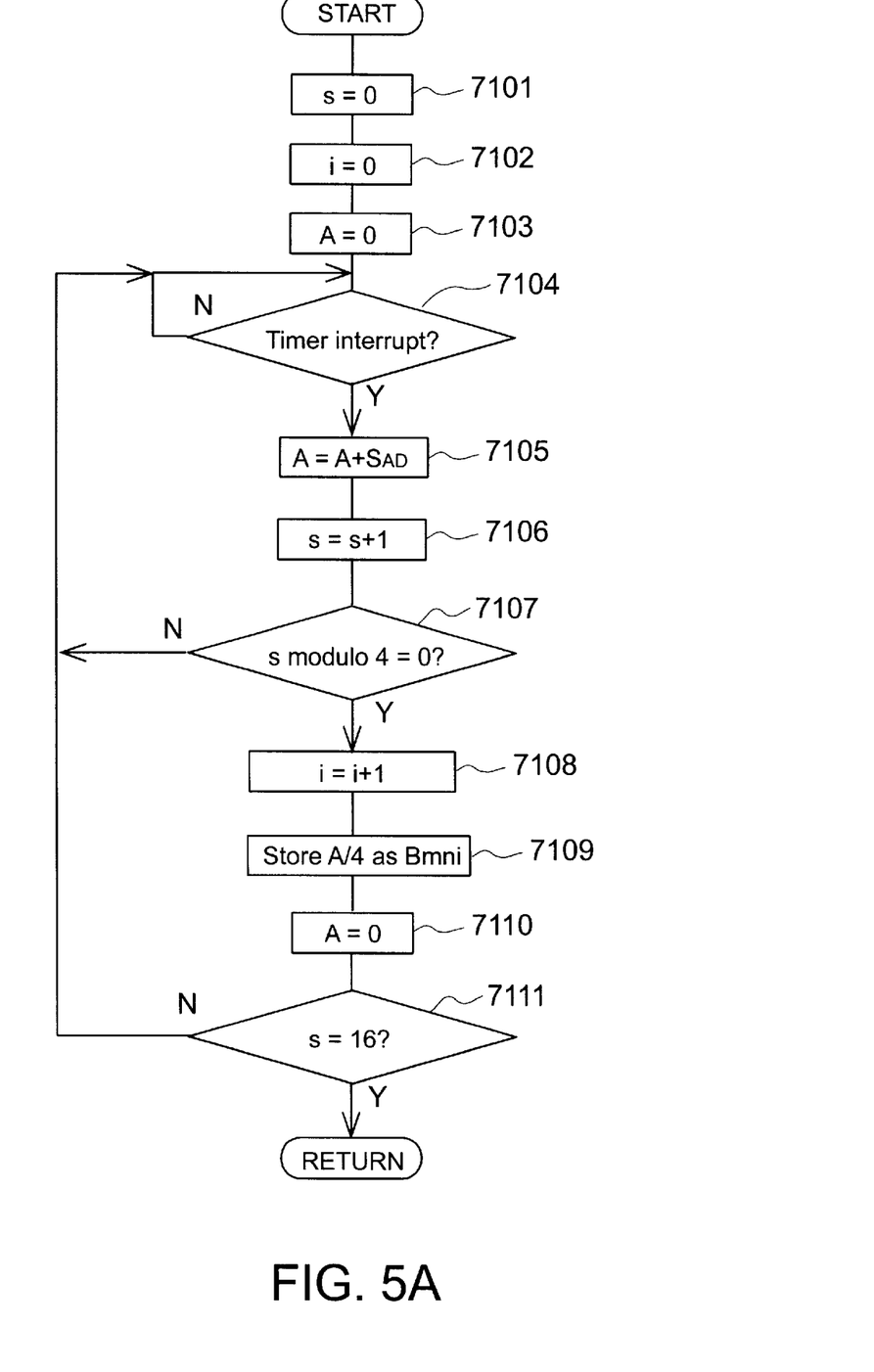
FIG. 5A is a flow chart used to describe noise signal detection by the magnetic head in the MICR character recognition process shown in FIG. 4 and executed by the mechanism shown in FIG. 3.
Figure 5B:
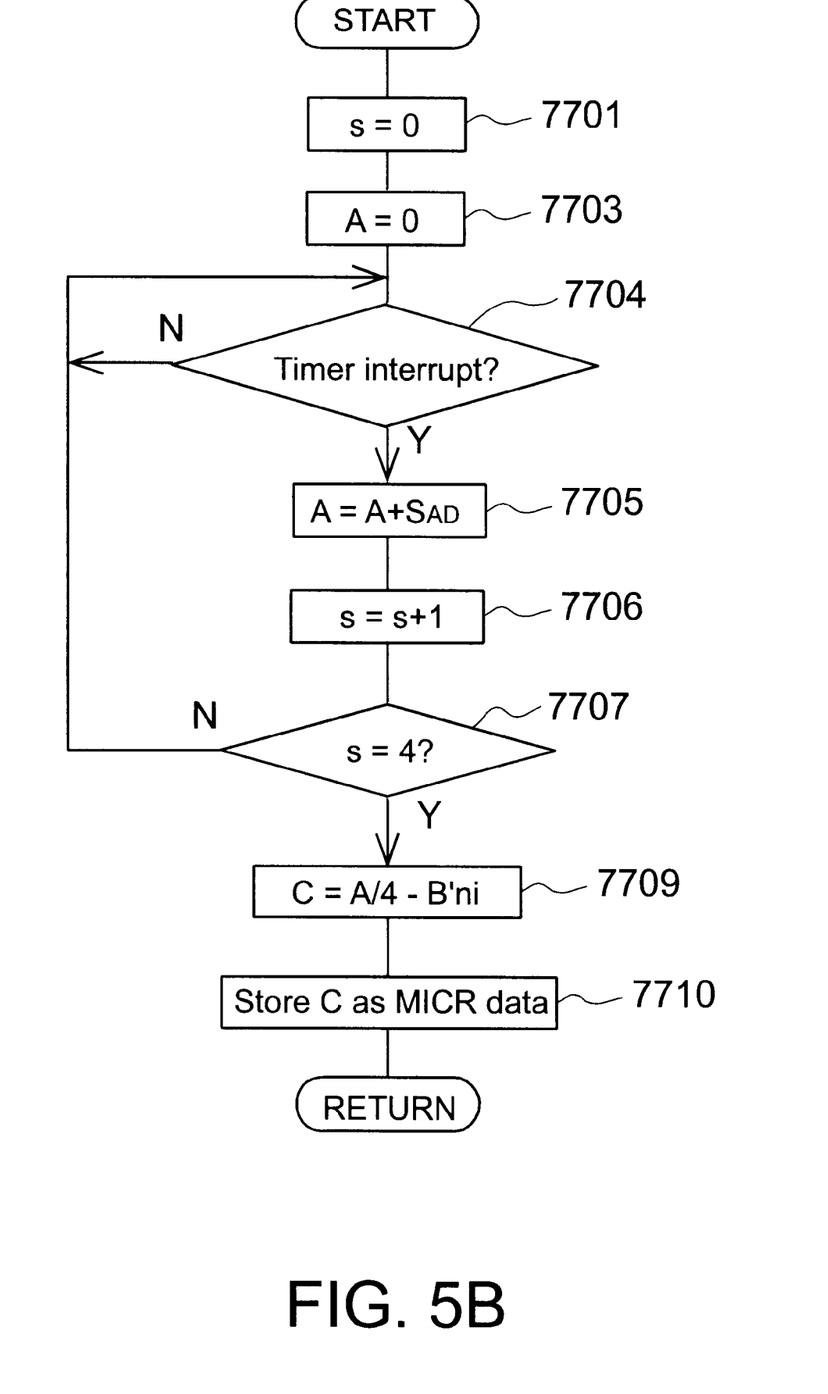
FIG. 5B is a flow chart used to describe raw magnetic ink character detection by the magnetic head in the MICR character recognition process shown in FIG. 4 and executed by the mechanism shown in FIG. 3.

Referring to FIG. 5A, in the steps 7101, 7102 and 7103 count variables s and i and a variable A are each initialized to zero. Step 7104 is a waiting step waiting for a timer interrupt. This timer interrupt is a periodic interrupt used for various operations, including timing for effectuating a pulse motor phase change. Pulse motor 45 of this embodiment is assumed to be a two-phase pulse motor controlled by two-phase excitation. Processor 67 thus controls rotation of pulse motor 45 by sequentially applying four different excitation patterns to motor control circuit 65. Each excitation pattern may be regarded as one drive pulse applied to the motor. The magnetic noise generated by a pulse motor is periodic within a certain number "N" of such drive pulses. A sequence of N drive pulses is therefore defined herein as a drive cycle and corresponds to the period of the periodic magnetic noise generated by the pulse motor. Depending on the particular structure of a pulse motor such drive cycle may or may not correspond to one revolution of the motor.

In the preferred embodiment, however, a drive cycle includes four drive pulses and corresponds to one complete revolution of the motor. Sampling of the detection data synchronized to the drive pulses is possible by using the timer interrupt as a sampling signal. Thus, whenever a timer interrupt is detected in step 7104, processor 67 samples the digital value currently output from A/D converter 64 to obtain a sample value $S_{AD}$ and adds this sample value to the variable A initialized in step 7103 (step 7105). In this embodiment, every 16 timer interrupts another drive pulse is applied to the pulse motor, i.e., the excitation pattern is changed. This means that for each drive pulse 16 sample values $S_{AD}$ are obtained from A/D converter 64. The average of each sequence of four sample values is calculated and used as one representative detection value. Four detection values are thus obtained for each drive pulse.

It should be noted here that it is not always necessary to take the average of four samples. Instead, the sample values themselves could be used as detection values. Also, the number of timer interrupts generated during one drive pulse need not necessarily be sixteen in order to implement the teachings of the invention.

Step 7106 increments the count variable s thereby to count the number of sample values taken, i.e., the number of timer interrupts. Step 7107 checks whether the value of s is an integer multiple of 4. If not, the processing returns to step 7104 to wait for the next timer interrupt. Otherwise, i is incremented in step 7108, and in step 7109 the variable A is divided by 4 and the result is stored as detection value $B_{mni}$. Integer index i denotes the current detection value within a drive pulse, i.e., $0 \leq i \leq 3$ in this embodiment when 4 detection values per pulse are contemplated. Likewise, Integer index n denotes the current drive pulse within a given drive cycle, i.e., $0 \leq n \leq 3$ where N=4. Index m denotes the number of drive cycles to be asserted in order to obtain reliable magnetic noise compensation data, and its purpose will be explained in more detail hereinbelow. While in this embodiment the average value is taken as the arithmetic mean value, the square root mean value could be used instead.

In step 7110 A is reset to zero. Step 7111 checks whether s equals 16, i.e., whether or not 16 sample values have been taken. If s equals 16 it means that the end of the current drive pulse has been reached because the next drive pulse is applied in response to the sixteenth timer interrupt. If s has not reached 16 yet the process loops back to step 7104 to wait for the next timer interrupt to be generated and perceived. Otherwise, the subprocess terminates naturally and control returns to the main process illustrated in FIG. 4. As will be understood by a routineer upon review of FIG. 5A in conjunction with the above description thereof, when the subprocess ends, four detection values $B_{mn0}$ to $B_{mn3}$ have been obtained and stored in RAM 68.

Returning to FIG. 4, step 72 increments n for applying the next drive pulse and step 73 checks whether n=4, i.e., whether the process of FIG. 5A has been executed for four successive drive pulses. If not, the process loops back to step 71 to apply the next drive pulse of the current drive cycle m and obtain four additional detection values therefor using the subprocess outlined above with respect to FIG. 5A. Otherwise, m is incremented in step 74 indicating that a drive cycle has been completed. Step 75 checks whether m=16, i.e., whether sixteen drive cycles have already been completed. If not, the process loops back to step 71. Otherwise, a total of 256 detection values have been stored, four detection values for each of four drive pulses in each of sixteen drive cycles.

Step 76 selects 64 "medium" noise compensation values from the stored 256 detection values. It should be noted here that magnetic noise from sources other than the pulse motor, including magnetic dust on the rollers, can also occur. Such magnetic noise is not periodic but rather aperiodic, spontaneous or statistic in nature. Accordingly, in the preferred embodiment, magnetic noise measurement is performed through sixteen drive cycles to avoid such aperiodic noise influencing the measurement result for the periodic magnetic noise component. If simply the average were taken over the sixteen drive cycles aperiodic or statistic magnetic noise would be likely to still have an influence. Therefore, the presently preferred embodiment of the invention groups the 256 detection values in 64 groups, each group including all detection values of m=0 to 15 having the same values of n and i. In other words, all detection values in a particular group correspond to the same time sample point within drive cycle period (group of timer interrupts as represented by i, and sequence number of drive pulse as represented by n) for each one of the sixteen drive cycles which have been sampled.

The detection values in each group are likely to show some degree of dispersion about a medium (or quasi-medium) noise value due to the statistic or aperiodic noise mentioned above. According to the preferred embodiment of the invention, the 16 detection values for each group are ordered in ascending magnitude. Next, four values having the lowest relative magnitude and the four values having the highest relative magnitude are discarded to filter out freak or abnormal aperiodic noise signal samples. The remaining eight detection values (m=4–11) for each group are interrogated to determine frequency of result within the group, and a voting subprocess or circuit is used to select the detection value having the highest frequency in the group as the noise compensation value $B'_{ni}$ therefor. Alternatively, in order to simply computational requirements, the remaining eight detection values may be averaged to arrive at a single, albeit quasi-medium, noise compensation value $B'_{ni}$.

As a result, 64 compensation values representing four values in each of four drive pulses of one drive cycle are obtained to thereby substantially eliminate the effects of any aperiodic or statistic noise. It will be appreciated by those skilled in the art that the numbers 4, 4, 16 (average of four sample values, four drive pulses per drive cycle and sixteen drive cycles) are related to the particular embodiment and are not critical to the teachings of the invention. It will be further appreciated that the particular number of detection values discarded per group need not be limited to 8 as detailed hereinabove, and potentially all of the detection values can be considered in arriving at a medium value depending on the computational or circuitry resources available as well as the required accuracy of the noise compensation values.

Turning back to FIG. 4, the area of check 16 containing MICs is then advanced to magnetic head 31 and reading and noise compensation is performed in step 77. The details of the process represented by step 77 are shown in FIG. 5B. Steps 7701 and 7703 to 7706 correspond to steps 7101 and 7103 to 7106, respectively, in FIG. 5A and need not be described again. Step 7707 checks whether s=4, i.e., whether four sample values have been accumulated in variable A. If not, the process returns to step 7704 waiting for the next timer interrupt. Otherwise, A is divided by 4 in step 7709, i.e., the average of four sample values resulting from reading the MIC pattern is calculated. Noise compensation value $B'_{ni}$ is subtracted from this average value. Remember $B'_{ni}$ is the selected one of the noise detection values previously obtained for the same time period (represented by n and i) with respect to one drive cycle as the current average value A/4. It is to be noted that, although not shown in the drawing, while reading the MICs processor 67 keeps track of the sequence numbers of the average value A/4 and the drive pulse within each drive cycle, i.e., sequence numbers corresponding to n and i as defined above for the first subprocess. Processor 67 uses these sequence numbers to retrieve the associated $B'_{ni}$ from RAM 68. By the subtraction the magnetic noise component is removed. The resulting value C is stored in step 7710 in RAM 68. Returning to FIG. 4, step 77 is repeated until no more MICs are detected (step 78). The respective values C thus obtained and stored represent substantially noise free MICR data used in a subsequent recognition process which itself may be conventional and is not subject of the present invention. The detection in step 78 may be based on either the length of the MICR area on check 16 or the MICR data. In the first case a predetermined number of drive pulses corresponding to the length of the MICR area is counted while in the second case the end of the detection is determined after a certain number of successive MICR data C are zero or below a certain threshold value indicating that the magnetic head detects magnetic noise only.

In printer 10 as thus described, the pulse motor is driven under the same conditions used for MICR character detection in areas not containing MICR characters. The signals detected by the magnetic head during this period are captured synchronized to the drive pulse(s) supplied to the pulse motor, and are temporarily stored as compensation data. In the MICR character detection process the signals detected by the head are again captured synchronized to the drive pulse(s), and are compensated for noise by subtracting therefrom the data captured at the same timing point from the area not containing MICR characters. The effects of magnetic noise caused by the pulse motor from phase changes accompanying the drive pulse can thus be removed.

Moreover, the effects of unexpected magnetic noise can also be removed by printer 10 of the preferred embodiment by sampling the compensation data over a period of plural cycles because of the regular control cycle of pulse motor 45, i.e., the cycle rotating the pulse motor one electrical cycle only. By then using the medium of plural samples as the compensation data, the compensation data for one cycle can be obtained. As will be recognized by those ordinarily skilled in the art, this compensation data can then be used for repeated compensation processing during the MICR character detection and recognition process.

Furthermore, magnetic noise is measured in an area not containing MICR characters immediately before MICR character detection in every MICR character recognition process executed by the preferred embodiment. As a result, magnetic noise data reflecting the current pulse motor condition and the operating environment of the printer 10 can be obtained to ensure that the compensation process reflects environmental changes. The MICR character recognition rate can therefore also be improved.

By thus removing magnetic noise synchronized to pulse motor operation in the MICR character recognition process, the effects of cyclical magnetic noise from the pulse motor, for example, can be substantially eliminated. Therefore, by using a magnetic shield and the MICR character recognition method described above in a printer 10 according to the present invention, the effects of the pulse motor can be substantially eliminated. As a result, a high MICR character recognition rate can be achieved even in a compact compound POS printer in which sufficient distance from the pulse motor to the magnetic head cannot be obtained due to recording functionality constraints and which uses a single pulse motor for plural functions. A compound POS printer free of reading errors can therefore be provided.

Furthermore, because the effects of magnetic noise from the pulse motor can be substantially eliminated by using the MICR character recognition method of the preferred embodiment, a sufficient MICR character recognition rate can be achieved in even smaller compound POS printer in which a magnetic shield cannot be disposed.

It should be noted that while the present invention has been described using by way of example a printer capable of processing personal checks printed with MICR characters, it will be obvious that the invention can also be used in magnetic card readers and other devices recognizing related types of magnetic patterns.

Furthermore, the effects of magnetic noise caused by the pulse motor can also be removed and the magnetic pattern recognition rate can be improved by applying the same techniques described above in other devices in which the magnetic head is moved by the pulse motor across the magnetic pattern.

By using the magnetic pattern recognition techniques of the presently preferred embodiment as described above, the effects of magnetic noise from a pulse motor can be suppressed and the recognition rate can be dramatically improved in devices in which the relationship between the positions of the pulse motor and magnetic head is limited or shielding measures against pulse motor magnetic noise are difficult because of the device construction. As a result, it is possible through the teachings of the preferred embodiment of the invention to maintain a high recognition rate while reducing the size of such magnetic pattern recognition apparatuses as dedicated magnetic ink character readers.

Furthermore, because the effects of the pulse motor can be suppressed in compound POS printers combining a printer function with a magnetic pattern recognition function, a single pulse motor can be used for these plural functions, and a compact, high recognition rate, high functionality compound POS printers can be provided at low cost.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A magnetic pattern recognition method for recognizing magnetic patterns while a magnetic head for detecting magnetic patterns is moved relative to an area containing said magnetic pattern by means of a moving means comprising a pulse motor that is controlled by a drive pulse, comprising a first process for moving the magnetic head relative to an area not containing a magnetic pattern by means of the moving means, a second process for regularly storing a first signal detected by the magnetic head in the first process, a third process for moving the magnetic head relative to an area containing a magnetic pattern by means of the moving means and regularly detecting the magnetic pattern using the magnetic head to obtain a second signal, and a fourth process accomplishing a compensation process subtracting the first signal from the second signal detected regularly by the magnetic head in the third process to obtain and output a magnetic pattern recognition signal.

2. The magnetic pattern recognition method according to claim 1, wherein the detection timing of the first and second signals detected in the second and fourth processes is synchronized to the drive pulse.

3. The magnetic pattern recognition method according to claim 2, wherein the detection timing of the first signal in the second process is synchronized to plural drive pulses constituting at least one control cycle of the pulse motor.

4. The magnetic pattern recognition method according to claim 3, wherein the first signal is detected in the second process for plural control cycles, and a fifth process defining the medium value of plural first signals as the first signal to which the compensation process is applied is further provided before the third process.

5. The magnetic pattern recognition method according to claim 1, wherein the magnetic patterns are magnetic ink characters.

6. A magnetic pattern recognition apparatus comprising a moving means having a pulse motor that is controlled by a drive pulse, a magnetic head for detecting magnetic patterns while being moved relative to an area containing said magnetic pattern by means of said moving means, a storage means for storing a first signal regularly detected by the magnetic head when the magnetic head is moved by the moving means relative to an area not containing a magnetic pattern, and an output means for accomplishing a compensation process subtracting the first signal from a second signal detected regularly by the magnetic head when the magnetic head is moved by the moving means relative to an area containing a magnetic pattern, and outputting the result as the magnetic pattern recognition signal.

7. The magnetic pattern recognition apparatus according to claim 6, wherein the storage means stores the first signal at a timing synchronized to the drive pulse, and the output means accomplishes the second signal compensation process at a timing synchronized to the drive pulse.

8. The magnetic pattern recognition apparatus according to claims 6 or 7, wherein the magnetic patterns are magnetic ink characters.

9. A compound process apparatus comprising a paper transportation means having a pulse motor controlled by a drive pulse, a printing means for printing to the paper slip transported by the paper transportation means, a magnetic head for detecting the magnetic pattern on the paper slip transported by the paper transportation means, a storage means for storing a first signal regularly detected by the magnetic head when the paper transportation means transports an area of the paper slip not containing a magnetic pattern to the magnetic head, and an output means for accomplishing a compensation process subtracting the first signal from a second signal detected regularly by the magnetic head when the paper transportation means transports an area of the paper slip containing a magnetic pattern to the magnetic head, and outputting the result as the magnetic pattern recognition signal.

10. A compound process apparatus according to claim 9, wherein the storage means stores the first signal at a timing synchronized to the drive pulse, and the output means accomplishes the second signal compensation process at a timing synchronized to the drive pulse.

11. A compound process apparatus according to claim 10, wherein the magnetic patterns on the paper slips are magnetic ink characters.

12. For use with a recognition apparatus having a magnetic head and transport mechanism, a method of reading magnetic ink patterns disposed on a predetermined area of a medium secured by the transport mechanism, the method comprising the steps of:

(a) applying plural drive pulses to the transport mechanism for causing a scanning motion of said medium relative to the magnetic head;

(b) obtaining and storing, as respective first sample signals, plural output signals generated by the magnetic head at a first set of predetermined time points during the scanning motion while the magnetic head is outside of the predetermined area;

(c) subsequently obtaining, as respective second sample signals, plural output signals generated by the magnetic head at a second set of predetermined time points corresponding to the first set of predetermined time points during the scanning motion while the magnetic head is inside said predetermined area; and (d) subtracting from each second sample signal obtained in step (c) the corresponding first sample signal stored in step (b) and outputting the respective differences as a magnetic pattern recognition signal.

13. The method of claim 12, wherein the first and second predetermined time points are synchronized with the drive pulses applied in said applying step (a).

14. The method of claim 13, wherein step (b) comprises obtaining and storing the first sample signals for a predetermined grouping (i) of the first set of predetermined time points within and synchronized to each of a predetermined number (n) of the drive pulses applied in said applying step (a), the predetermined number of drive pulses representing a drive cycle of the transport mechanism corresponding to one period of periodic magnetic noise generated by the transport mechanism.

15. For use with a recognition apparatus having a magnetic head and transport mechanism for securing and moving a medium relative thereto, a method of reading magnetic ink patterns disposed on a predetermined area of the medium, the method comprising the steps of:

(a) applying plural cycles of drive pulses to the transport mechanism for causing a scanning motion of said medium relative to the magnetic head;

(b) obtaining and storing, as respective first sample signals, plural output signals generated by the magnetic head at preselected time points within a first one of the drive cycles applied to the transport mechanism while the magnetic head is outside of the predetermined area;

(c) subsequently obtaining, as respective second sample signals, plural output signals generated by the magnetic head at preselected time points within a second one of the drive cycles applied to the transport mechanism while the magnetic head is inside said predetermined area; and (d) subtracting from each second sample signal obtained in step (c) the corresponding first sample signal stored in step (b) and outputting the respective differences as a magnetic pattern recognition signal.

16. The method of claim 15, wherein the preselected time points within the second drive pulse cycle is synchronized to the preselected time points within the first drive pulse cycle.

* * * * *

UNITED STATES PATENT AND TRADEMARK OFFICE
CERTIFICATE OF CORRECTION

PATENT NO. : 5,959,279
DATED : September 28, 1999
INVENTOR(S) : Kenji Komatsu

It is certified that an error appears in the above identified patent and that said Letters Patent is hereby corrected as shown below:

Title page, item 56, References Cited, insert --Foreign Patent Documents 2 438 301   4/1980   France 56-145467   11/1981   Japan 4-52988   2/1992   Japan--.

Signed and Sealed this

Second Day of May, 2000

Attest:

Q. TODD DICKINSON

*Attesting Officer*     *Director of Patents and Trademarks*